(12) United States Patent
Wood et al.

(10) Patent No.: US 7,536,157 B2
(45) Date of Patent: May 19, 2009

(54) SELECTING MODULATION AND AMPLIFICATION IN A TRANSMITTER

(75) Inventors: Peter Wood, Cambridgeshire (GB); Simon Howden Morris, Cambridge (GB); Timothy John Newton, Suffolk (GB); Peter William Stephenson, Cambridge (GB)

(73) Assignee: Cambridge Silcon Radio Limited, Cambridge (GB)

( * ) Notice: Subject to any disclaimer, the term of this patent is extended or adjusted under 35 U.S.C. 154(b) by 304 days.

(21) Appl. No.: 11/307,480

(22) Filed: Feb. 9, 2006

(65) Prior Publication Data

US 2007/0184787 A1 Aug. 9, 2007

(51) Int. Cl.
*H04B 1/02* (2006.01)
*H01Q 11/12* (2006.01)
(52) U.S. Cl. .................................. 455/103; 455/127.2
(58) Field of Classification Search .............. 455/550.1, 455/552.1, 102, 103, 126, 127.1, 127.2, 127.3, 455/127.4

See application file for complete search history.

(56) References Cited

U.S. PATENT DOCUMENTS

| 5,530,920 A * | 6/1996 | Takeda | 455/102 |
| 7,177,607 B2 * | 2/2007 | Weiss | 455/127.1 |
| 7,239,855 B2 * | 7/2007 | Matsui et al. | 455/127.1 |

FOREIGN PATENT DOCUMENTS

JP 02000013246 A * 1/2000

* cited by examiner

*Primary Examiner*—Nguyen Vo
(74) *Attorney, Agent, or Firm*—Novak Druce Deluca + Quigg LLP

(57) ABSTRACT

A transmitter for transmitting signals, comprising: a modulator for modulating a data signal, the modulator being capable of modulating the data signal according to any of two or more modulation schemes to form a modulated signal; an amplification arrangement for amplifying the modulated signal with any of two or more levels of gain; and a control system configured to interdependently select one of the modulation schemes and one of the levels of gain, and to control the modulator to adopt the selected modulation scheme and to control the amplifier to adopt the selected level of gain.

21 Claims, 1 Drawing Sheet

SELECTING MODULATION AND AMPLIFICATION IN A TRANSMITTER

BACKGROUND OF THE INVENTION

This invention relates to selecting the modulation scheme and/or the amplification scheme that is to be used in a data transmitter, for example a radio transmitter.

FIG. 1 is a schematic view of an example of a radio transmitter. The transmitter has an input 1 at which it receives a stream of data to be transmitted. That data is modulated by a modulation stage 2. The output of the modulation stage is amplified by an amplifier stage 3 and the resulting signal passes to an antenna 4 from which it is transmitted.

The modulation stage 2 is capable of modulating signals according to a number of modulation schemes. The scheme that is to be used is selected by a control unit 5. These schemes may differ in their data rate, their power consumption or their sensitivity to interference. The control unit is programmed to select a scheme in response to conditions in the system: for example, the current error rate between the transmitter and a receiver.

The amplifier stage 3 is capable of applying a range of levels of amplification. The level of amplification that is to be used is selected by the control unit 5, in response to conditions such as the estimated loss over a link between the transmitter and a receiver, or in response to power control signals received from the receiver. The variation in amplification may be achieved by a single amplifier unit or by a combination of a pre-amplifier 6, which is always in-circuit, and a power amplifier 7 which can be switched in when high gain is required. In either case, the response of the amplifier is typically less accurate at higher levels of gain.

This inaccuracy may have different effects on different modulation schemes. Some schemes may be relatively unaffected whereas other schemes may become distorted to the extent that at high levels of gain they cannot be decoded at the receiver. The non-linearity of the amplifier may cause spectral distortion such that under some modulation schemes the transmitter transmits significant levels of power outside its permitted frequency band. In a typical application, two devices may be interoperating at short range using a high data rate modulation scheme and without using a power amplifier. As the range increases, the two devices may communicate using a standard power control mechanism (or by other means) and agree that the transmitted power level in the link should be raised. This may involve taking a power amplifier into use, which may cause distortion with a high data rate modulation scheme.

One way to resolve this is to use an amplifier stage that has a better linearity. However, this may increase cost and occupy a greater area on the circuit board or integrated circuit on which it is implemented.

There is therefore a need for an improved method of controlling a transmitter.

SUMMARY OF THE INVENTION

According to one aspect of the present invention there is provided a transmitter for transmitting signals, comprising: a modulator for modulating a data signal, the modulator being capable of modulating the data signal according to any of two or more modulation schemes to form a modulated signal; an amplification arrangement for amplifying the modulated signal with any of two or more levels of gain; and a control system configured to interdependently select one of the modulation schemes and one of the levels of gain, and to control the modulator to adopt the selected modulation scheme and to control the amplifier to adopt the selected level of gain.

Preferably the control system is capable of operation in one or more modes in which it is restricted to selecting a respective subset of combinations of the available modulation schemes and available levels of gain.

Preferably the control system is capable of operation in a first mode in which it is restricted to selecting a subset of combinations of the available modulation schemes and available levels of gain, which subset excludes the combination of one modulation scheme and levels of gain greater than a threshold and includes the combination of that modulation scheme and levels of gain below that threshold, and includes the combination of one other modulation scheme and levels of gain above that threshold.

Preferably the control system is capable of operation in a second mode in which it is restricted to selecting a subset of combinations of the available modulation schemes and available levels of gain, which subset excludes the combination of any of the modulation schemes with levels of gain greater than a threshold.

Conveniently the amplification arrangement includes two amplifiers and the control system is arranged to control the amplification arrangement to provide levels of gain below the threshold by means of a first one of those amplifiers and to provide levels of gain above the threshold by means of both of those amplifiers. The first one of the amplifiers may be implemented on a common integrated circuit with the modulator.

The transmitter may be a radio transmitter.

The control system may be responsive to a power control signal to select one of the modulation schemes and one of the levels of gain.

The control system may be capable of adopting any of two or more algorithms for selecting one of the modulation schemes and one of the levels of gain.

The control system may be configured to adopt one of the said algorithms under the control of a user.

The control system may be configured to, when communicating with a receiver, adopt one of the said algorithms under the control of the receiver.

The control system may be factory-configured to adopt one of the said algorithms.

According to a second aspect of the present invention there is provided a transmitter for transmitting signals, comprising: a modulator for modulating a data signal, the modulator being capable of modulating the data signal according to any of two or more modulation schemes to form a modulated signal; an amplification arrangement for amplifying the modulated signal with any of two or more levels of gain; and a control system configured to select one of the modulation schemes and one of the levels of gain, and to control the modulator to adopt the selected modulation scheme and to control the amplifier to adopt the selected level of gain, the control system being configured for operation in:

a first mode in which it is restricted to selecting a subset of combinations of the available modulation schemes and available levels of gain, which subset excludes the combination of one modulation scheme and levels of gain greater than a threshold and includes the combination of that modulation scheme and levels of gain below that threshold, and includes the combination of one other modulation scheme and levels of gain above that threshold; and a second mode in which it is restricted to selecting a subset of combinations of the available modulation schemes and available levels of gain, which subset excludes the combination of any of the modulation schemes with levels of gain greater than a threshold.

BRIEF DESCRIPTION OF THE DRAWINGS

The present invention will be described by way of example with reference to the accompanying drawing, in which.

DETAILED DESCRIPTION OF THE PREFERRED EMBODIMENT

Figure 1:
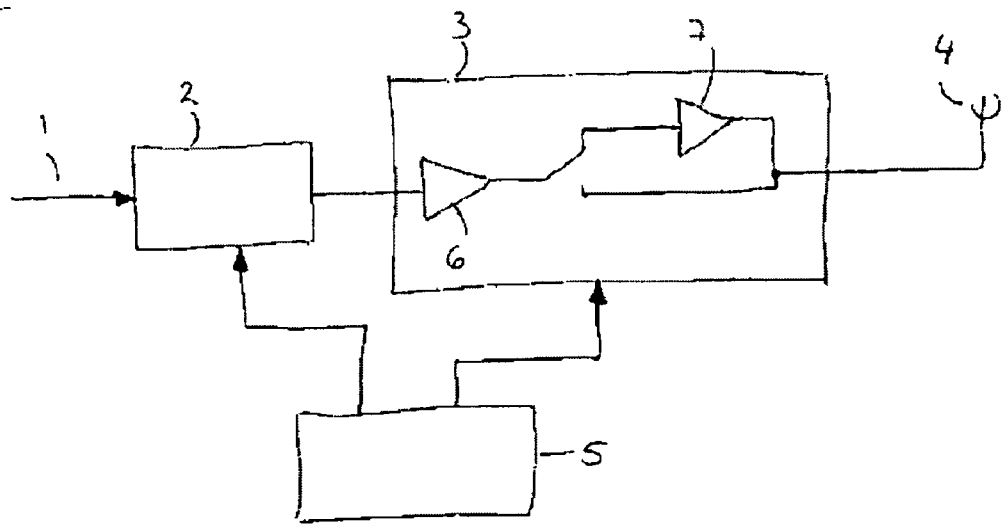
FIG. 1 shows schematically a transmitter device.
Figure 2:
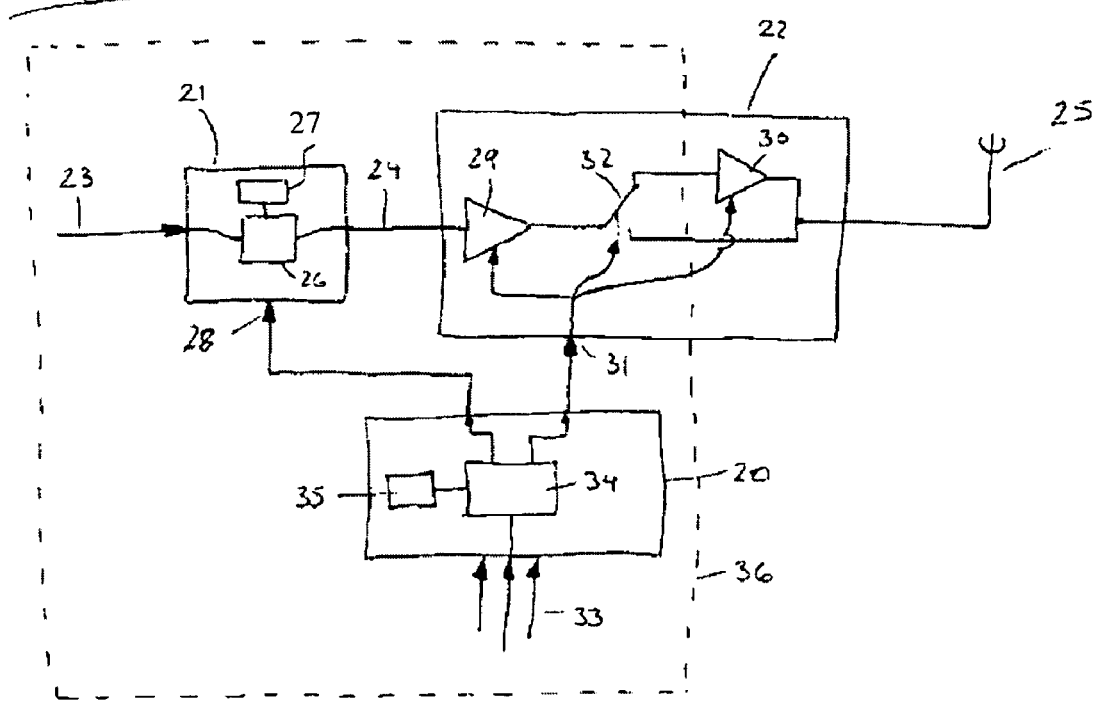
FIG. 2 shows schematically another transmitter device.

The transmitter device of FIG. 2 is broadly similar to that of FIG. 1. However, in the device of FIG. 2 the control unit 20 is arranged to control the modulator 21 and the amplifier section 22 in such a way that their operating modes are interrelated. Rather than the modulation scheme and the gain of the amplifier section being set independently, the control unit 20 is arranged such that the two are selected in an interdependent manner.

In more detail, the transmitter device of FIG. 2 comprises a data input 23 for receiving traffic data to be transmitted. Data received at the input 23 passes to the modulator 21 which modulates it to form a modulated data stream at 24. The modulated data stream is amplified by amplifier section 22, and the output of the amplifier section passes to an antenna 25 from which it is transmitted.

The modulator 21 could be implemented in any suitable way, in analog or digital or a combination of the two. In this example the modulator 21 is implemented by a digital modulation unit 26 which processes the received traffic data in accordance with instructions stored in a memory 27. The memory stores instructions for modulating data according to a variety of modulation schemes. The modulation schemes may differ in their data rate, their power consumption or their sensitivity to interference. Non-limiting examples of the modulation schemes include Gaussian frequency shift keying (GFSK), differential quadrature phase shift keying (pi/4 D4PSK) and differential 8-phase shift keying (D8PSK). The mode in which the modulation unit operates is dependent on a control signal applied to a control input 28. In response to the control signal the modulator unit operates in accordance with the appropriate set of instructions.

In an alternative embodiment the modulator 21 could contain a set of parallel processing paths, each for performing modulation of a respective type. One of the modulation paths could be selected for use in dependence on the control signal at input 28.

The amplifier section 22 may contain one or more amplifiers. In this example it includes a pre-amplifier 29 which is capable of a relatively low level of amplification and a power amplifier 30 which is capable of a relatively high level of amplification. The operation of these amplifiers is dependent on a control signal applied to a control input 31. This independently controls the gain of amplifier 29, the gain of amplifier 30 and the condition of a switch 32. The switch 32 has two settings. In one setting it switches amplifier 30 in series with amplifier 29 so that they successively amplify the modulated data stream. In the other setting it switches amplifier 30 out of circuit so that the modulated data stream is amplified only by amplifier 29.

The control unit 20 receives various inputs, as indicated schematically at 33. These pass to a control processor 34 which operates in accordance with program logic stored in a memory 35 to process those inputs and in dependence on them to form control outputs for selecting the mode of the modulator 21 and for controlling the operation of the amplifier section 22. The nature of the inputs 33 will depend on the application, but for example they could include the following:
power control signals indicating a desired transmit power or a desired increase or decrease in power;
data rate selection signals indicating a desired data rate or a desired increase or decrease of data rate;
error rate signals indicating the current error rate over the link from the transmitter to a receiver, as reported by the receiver; and
mode priority signals of the type that will be discussed below.

As indicated above, control of the modulator 21 and the amplifier section 22 is interlinked. This may be achieved by various logic implementations, but the effect is that in at least some circumstances one or more combinations of the possible modes of those units are barred from being selected by the control unit 20. One way in which this may be achieved is by the controlling unit dropping back to a lower power or a slower modulation scheme when a combination has been tried and has been found to give unacceptable results. Another way is for the control unit to be arranged to be capable of restricting itself to a subset of the possible combinations. Various strategies are available for selecting how to drop back or which combinations are to be barred. Examples of possible strategies include:
1. As the required power increases, the control mechanism could cause the transmitted modulation scheme to avoid the most complex modulation scheme(s) when greater than a pre-set level of gain is employed. This mode can provide extra range at the expense of data throughput.
2. As the required power increases, the control mechanism could cause the level of gain to be limited so as not to exceed a pre-set maximum level that is below the maximum that can be achieved by the amplifier stage. This mode can provide maximum data throughput at the expense of range.

The control unit 20 could be capable of operating according to only one such strategy; or according to two or more such strategies, responsive to a mode priority signal that indicates which operating mode it is currently to operate in.

For illustration, the operation of an example transmitter under two possible control mechanisms will be described. The example transmitter has three available modulation schemes (A, B and C, where C offers the highest data rate) and three power levels (P1, P2 and P3, where P3 is the highest power). It receives three control signals, as follows:
Power demand signal. Value from 1 to 3, where 3 indicates the highest power demand.
Data rate demand signal. Value from 1 to 3, where 3 indicates the highest data rate demand
Mode priority signal Value is 0 or 1, where 0 indicates range priority and 1 indicates throughput priority.

Under one possible control mechanism the control unit attempts operation with a preferred combination of modulation scheme and gain level, as indicated by the power demand signal and the data rate demand signal. If that is combination is deemed not to be successful then it falls back to another combination. A combination may be found to be unsuccessful if the transmitter itself or a receiver detects that the signal to be transmitted or the signal as received is excessively distorted. For example, the receiver may report to the transmitter that it is incapable of successfully demodulating the received signal, or that the error rate (e.g. the bit error rate) for data it is receiving from the transmitter exceeds a pre-set threshold. As an illustration, in the present example system the transmitter could adopt modulation scheme C and gain level P3 when commanded to use maximum power and data rate. If that combination is found by the receiver to be unsuccessful, since the received signals are too distorted, that fact is reported by the receiver to the transmitter and the transmitter then automatically falls back to an alternative combination of modulation scheme and gain.

The way in which the fall-back is implemented will depend on whether the transmitter is giving a higher priority to range or data throughput. It could fall back to a lower power if the mode priority signal indicates throughput priority, or to a lower modulation scheme if the mode priority signal indicates range priority. The combination to which it falls back is also dependent on the current modulation scheme and gain.

Under a second possible control mechanism the need for fall-back could be avoided by the control unit being pre-programmed with a set of permissible modes that implement the desired operating strategies. Under this mechanism the operation of the control unit of the example transmitter is as follows. In dependence on the mode priority signal the control unit selects one of the tables 1 and 2 as shown below. These are stored as look-up tables in memory 35. It then looks up the appropriate gain level and modulation scheme from the selected table based on the current values of the power demand signal and the data rate demand signal.

TABLE 1

| | | Power demand signal: | | |
|---|---|---|---|---|
| | | 1 | 2 | 3 |
| Data rate demand signal: | 1 | Modulation mode A | Modulation mode A | Modulation mode A |
| | | Gain level P1 | Gain level P2 | Gain level P3 |
| | 2 | Modulation mode B | Modulation mode B | Modulation mode A |
| | | Gain level P1 | Gain level P2 | Gain level P3 |
| | 3 | Modulation mode C | Modulation mode C | Modulation mode A |
| | | Gain level P1 | Gain level P2 | Gain level P3 |

TABLE 2

| | | Power demand signal: | | |
|---|---|---|---|---|
| | | 1 | 2 | 3 |
| Data rate demand signal: | 1 | Modulation mode A | Modulation mode A | Modulation mode A |
| | | Gain level P1 | Gain level P2 | Gain level P2 |
| | 2 | Modulation mode B | Modulation mode B | Modulation mode B |
| | | Gain level P1 | Gain level P2 | Gain level P2 |
| | 3 | Modulation mode C | Modulation mode C | Modulation mode C |
| | | Gain level P1 | Gain level P2 | Gain level P2 |

Under the regime of table 1 the transmitter is forced to fall back to modulation mode A when the power is set to gain level P3. This provides long range at the expense of throughput. Under the regime of table 2 the gain of the transmitter is limited to P2 but modulation mode C is available at all values of the power demand signal. This provides throughput at the expense of range. Other control regimes could be selected.

In practice, a system could have many more than three modulation schemes and three gain levels available. More than two operating modes could be available, and each could have its own fallback route or table of permitted modes.

The transmitter may operate in a radio system in which one device can communicate near-simultaneously with several other devices; whether using time-domain multiplexing, as in Bluetooth, or by other means. In that situation the operating mode (which equates, for instance, to a certain range/throughput compromise) can be chosen either on a per-transmitter basis or on a per-link basis. Under a per-transmitter basis the selected operating mode applies to all the radio links in which the transmitter participates. Under a per-link basis different operating modes can apply to different links in which the transmitter participates. The operating mode(s) and their scope can be selected by user intervention or by other means, for example in the factory.

The combinations of modulation schemes and gain levels that are to be permitted can be selected based on measured performance of the system. For example, if it is determined that for a particular combination of modulation scheme and gain level the system performs poorly because the amplifier section degrades the modulated signal then that combination can be barred. In the transmitter of FIG. 2, the amplifier section comprises two amplifiers: 29, 30. Since the linearity of the power amplifier is likely to be poorer than that of the preamplifier, one potential regime is that all modulation schemes are permitted for all gain levels at which the switch 31 is set to bypass the power amplifier, but that some modulation schemes are barred for all gain levels at which the power amplifier is in-circuit. For example:

In a range priority mode, as the required power increases the control mechanism could cause the transmitted modulation scheme to drop back to a simpler modulation scheme at the point at which a secondary amplifier is taken into use. In this mode, when the control unit 20 receives a power control command indicating that the gain should be increased above a threshold it controls the amplifier section 22 to increase the gain accordingly. However, if the modulation unit is currently operating at a modulation scheme that is not suitable for operation with the new level of gain it will commands the modulation unit 21 to adopt a modulation scheme that is less prone to distortion by the amplification section.

In a throughput priority mode the mechanism could cause the gain to be limited to remain below the point at which a secondary power amplifier would need to be taken into use. In this mode, when the control unit 20 receives a power control command indicating that the gain should be increased above a threshold it does not control the amplifier section 22 to increase the gain accordingly. The gain of the amplifier section is capped at the threshold level.

In one convenient implementation the control unit 20, the modulator 21 and the pre-amplifier 22 could be implemented on a single integrated circuit (IC) 36, whereas the power amplifier could be implemented off that IC, either on another IC or by means of discrete components. In that situation the transmitter is advantageously arranged so that the logic used to select modulation modes and gain levels is programmable from off the IC. This allows someone who implements the IC to select a set of allowed combinations of modulation scheme and gain that are suitable for the power amplifier they have chosen to use. This may be done in a number of ways. The memory 35 could be programmable from off the chip. Alternatively, the control means could be partially implemented on the IC and partially off it. The switch 32 and/or its means of control could be implemented off the IC.

In order for the intended receiver to demodulate the transmitted signals it must have knowledge of the modulation scheme that is in use. One option is for the transmitter and receiver to signal between each other to agree on a modulation scheme that is to be used. Another option is for the receiver to demodulate the received signals using all the available modulation schemes and to see by which scheme the demodulated signals can be successfully decoded.

In a transmitter that has as its available modulation schemes GFSK, D4PSK and D8PSK it has been found useful to adopt D4PSK when higher gain is required, and D8PSK when a higher data rate is required.

The transmitter described above could be implemented in any suitable device. For instance, it could be used as a transmitter for relatively short-range signals: e.g. as a Bluetooth transmitter; or as the transmitter of a mobile phone or a wireless LAN (local area network) device. In the case of Bluetooth, the modulation schemes could correspond to those associated with basic rate and enhanced data rate (EDR). In a range priority mode EDR modulation scheme could be barred from use with gain levels above a threshold and/or when an external amplifier is in use.

Instead of the permitted modes being indicated by a look-up table they could be defined by logic that operates on the inputs that influence the selection of the modes.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A transmitter for transmitting signals, comprising:
    a modulator for modulating a data signal, the modulator being capable of modulating the data signal according to any of two or more modulation schemes to form a modulated signal;
    an amplification arrangement for amplifying the modulated signal with any of two or more levels of gain; and
    a control system configured to interdependently select one of the modulation schemes and one of the levels of gain, and to control the modulator to adopt the selected modulation scheme and to control the amplifier to adopt the selected level of gain,
    wherein the control system is capable of operation in a first mode in which it is restricted to selecting a subset of combinations of the available modulation schemes and available levels of gain, which subset excludes the combination of one modulation scheme and levels of gain greater than a threshold and includes the combination of that modulation scheme and levels of gain below that threshold, and includes the combination of one other modulation scheme and levels of gain above that threshold.

2. A transmitter as claimed in claim 1, wherein the control system is capable of operation in one or more modes in which it is restricted to selecting a respective subset of combinations of the available modulation schemes and available levels of gain.

3. A transmitter as claimed in claim 1, wherein the amplification arrangement includes two amplifiers and the control system is arranged to control the amplification arrangement to provide levels of gain below the threshold by means of a first one of those amplifiers and to provide levels of gain above the threshold by means of both of those amplifiers.

4. A transmitter as claimed in claim 3, wherein the first one of the amplifiers is implemented on a common integrated circuit with the modulator.

5. A transmitter as claimed in claim 1, wherein the control system is capable of operation in a second mode in which it is restricted to selecting a subset of combinations of the available modulation schemes and available levels of gain, which subset excludes the combination of any of the modulation schemes with levels of gain greater than a threshold.

6. A transmitter as claimed in claim 5, wherein the amplification arrangement includes two amplifiers and the control system is arranged to control the amplification arrangement to provide levels of gain below the threshold by means of a first one of those amplifiers and to provide levels of gain above the threshold by means of both of those amplifiers.

7. A transmitter as claimed in claim 6, wherein the first one of the amplifiers is implemented on a common integrated circuit with the modulator.

8. A transmitter as claimed in claim 1, wherein the transmitter is a radio transmitter.

9. A transmitter as claimed in claim 1, wherein the control system is responsive to a power control signal to select one of the modulation schemes and one of the levels of gain.

10. A transmitter as claimed in claim 1, wherein the control system is capable of adopting any of two or more algorithms for selecting one of the modulation schemes and one of the levels of gain.

11. A transmitter as claimed in claim 10, wherein the control system is configured to adopt one of the said algorithms under the control of a user.

12. A transmitter as claimed in claim 10, wherein the control system is configured to, when communicating with a receiver, adopt one of the said algorithms under the control of the receiver.

13. A transmitter as claimed in claim 10, wherein the control system is factory-configured to adopt one of the said algorithms.

14. A transmitter for transmitting signals, comprising:
    a modulator for modulating a data signal, the modulator being capable of modulating the data signal according to any of two or more modulation schemes to form a modulated signal;
    an amplification arrangement for amplifying the modulated signal with any of two or more levels of gain; and
    a control system configured to select one of the modulation schemes and one of the levels of gain, and to control the modulator to adopt the selected modulation scheme and to control the amplifier to adopt the selected level of gain, the control system being configured for operation in:
    a first mode in which it is restricted to selecting a subset of combinations of the available modulation schemes and available levels of gain, which subset excludes the combination of one modulation scheme and levels of gain greater than a threshold and includes the combination of that modulation scheme and levels of gain below that threshold, and includes the combination of one other modulation scheme and levels of gain above that threshold; and
    a second mode in which it is restricted to selecting a subset of combinations of the available modulation schemes and available levels of gain, which subset excludes the combination of any of the modulation schemes with levels of gain greater than a threshold.

15. A transmitter as claimed in claim 14, wherein the amplification arrangement includes two amplifiers and the control system is arranged to control the amplification arrangement to provide levels of gain below the threshold by means of a first one of those amplifiers and to provide levels of gain above the threshold by means of both of those amplifiers.

16. A transmitter as claimed in claim 15, wherein the first one of the amplifiers is implemented on a common integrated circuit with the modulator.

17. A transmitter as claimed in claim 16, wherein the transmitter is a radio transmitter.

18. A transmitter as claimed in claim 14, wherein the control system is responsive to a power control signal to select one of the modulation schemes and one of the levels of gain.

19. A transmitter as claimed in claim 14, wherein the control system is configured to adopt one of the said modes under the control of a user.

20. A transmitter as claimed in claim 14, wherein the control system is configured to, when communicating with a receiver, adopt one of the said modes under the control of the receiver.

21. A transmitter as claimed in claim 14, wherein the control system is factory-configured to adopt one of the said modes.

* * * * *